US010402107B2

(12) United States Patent
Ward et al.

(10) Patent No.: US 10,402,107 B2
(45) Date of Patent: *Sep. 3, 2019

(54) DETERMINING TRACKS TO RELEASE IN A SOURCE VOLUME BEING COPIED TO A TARGET VOLUME

(71) Applicant: INTERNATIONAL BUSINESS MACHINES CORPORATION, Armonk, NY (US)

(72) Inventors: Matthew J. Ward, Vail, AZ (US); Gregory E. McBride, Vail, AZ (US); Joshua J. Crawford, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,349

(22) Filed: Dec. 13, 2017

(65) Prior Publication Data

US 2019/0179546 A1  Jun. 13, 2019

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0665* (2013.01)

(58) Field of Classification Search
CPC ...... G06F 3/0619; G06F 3/065; G06F 3/0665; G06F 3/067
See application file for complete search history.

(56) References Cited

U.S. PATENT DOCUMENTS

| 8,959,305 | B1 | 2/2015 | Lecrone et al. |
| 2014/0006853 | A1* | 1/2014 | Dudgeon ............ G06F 11/1435 714/15 |
| 2015/0261453 | A1 | 9/2015 | Ash et al. |
| 2016/0320988 | A1* | 11/2016 | Bish ...................... G06F 3/0619 |
| 2017/0206020 | A1 | 7/2017 | Brown et al. |
| 2017/0206158 | A1 | 7/2017 | Brown et al. |

OTHER PUBLICATIONS

B. Dufrasne, et al., "IBM DS8880 Thin Provisioning", International Business Machines Corp., Redpaper, Document No. REDP-5343-00, Aug. 2016, pp. 80.

(Continued)

*Primary Examiner* — Reginald G Bragdon
*Assistant Examiner* — Edward Wang
(74) *Attorney, Agent, or Firm* — David W. Victor; Konrad Raynes Davda & Victor LLP

(57) ABSTRACT

Provided are a computer program product, system, and method for determining tracks to release in a source volume being copied to a target volume. A consistency group is formed of tracks in the source volume to copy to the target volume. A volume table providing information on the tracks allocated to the source volume is copied to a volume table copy in a memory providing a state of the tracks in the source volume as of a consistency group time. A determination is made of tracks in the source volume to release for tracks that are indicated in the volume table copy as available to release excluding tracks in the source volume that are written after the consistency group time. Space allocated to the determined tracks is released.

23 Claims, 6 Drawing Sheets

(56) References Cited

OTHER PUBLICATIONS

C. Burger, et al., "Accelerate with IBM Storage: DS8880/DS8880F Thin Provisioning", IBM Washington Systems Center -Storage; 2017, pp. 89.
U.S. Appl. No. 15/604,420, filed May 24, 2017.
List of IBM Patents or Patent Applications Treated as Related, dated Dec. 13, 2017, pp. 2.
U.S. Appl. No. 15/840,375, filed Dec. 13, 2017.
US U.S. Appl. No. 15/840,363, filed Dec. 13, 2017.
Notice of Allowance dated Mar. 29. 2019, pp. 13, for U.S. Appl. No. 15/840,375.
Notice of Allowance for U.S. Appl. No. 15/840,363, dated May 1, 2019, 17 pp.
U.S. Appl. No. 16/430,747, dated Jun. 4, 2019.
U.S. Appl. No. 16/430,765, dated Jun. 4, 2019.
U.S. Appl. No. 16/430,777, dated Jun. 4, 2019.
List of IBM Patents or Patent Applications Treated as Related, Jun. 4, 2019, pp. 2.

\* cited by examiner

Mirror Copy Relationship Information

DETERMINING TRACKS TO RELEASE IN A SOURCE VOLUME BEING COPIED TO A TARGET VOLUME

BACKGROUND OF THE INVENTION

1. Field of the Invention

The present invention relates to a computer program product, system, and method for determining tracks to release in a source volume being copied to a target volume.

2. Description of the Related Art

Storage volumes may be "thin provisioned", meaning that extents of storage space are assigned to the volume but not allocated until needed. Additional extents may be allocated to the volume on an extent boundary at a time when an allocated extent is first written. Extents that are allocated but not being used for a "thin provisioned" volume may be released, i.e., unallocated, and available to assign to other thin provisioned volumes.

The data in a thin provisioned volume may be subject to a mirror copy operation, such as an asynchronous copy operation to a secondary volume. Data may be copied in consistency groups to provide the mirroring of changed data consistent as of a consistency group time. Data in the consistency group may comprise data that has been updated in the primary volume prior to a time of a next consistency group.

In current systems, if a space release command is received to release tracks within a consistency group being mirrored to a secondary volume, then the consistency group copy is cancelled to allow the space release command to complete. A new consistency group may be formed to cause the copying of all data prior to the previous consistency group formed.

Described embodiments provide improved technological solutions to optimize computer technology related to determine space to release for tracks a consistency group in-progress of being formed.

SUMMARY

Provided are a computer program product, system, and method for determining tracks to release in a source volume being copied to a target volume. A consistency group is formed of tracks in the source volume to copy to the target volume. A volume table providing information on the tracks allocated to the source volume is copied to a volume table copy in a memory providing a state of the tracks in the source volume as of a consistency group time. A determination is made of tracks in the source volume to release for tracks that are indicated in the volume table copy as available to release excluding tracks in the source volume that are written after the consistency group time. Space allocated to the determined tracks is released.

DETAILED DESCRIPTION

In current art, if a space release command is received to release space that is within a consistency group in progress of being formed as part of mirroring data to a second storage system, then the consistency group is canceled to allow the space release command to proceed. Described embodiments provide improvements and optimizations to the computer technology for releasing space in a consistency group automatically while forming a consistency group in a mirror copying environment. With the described embodiments, when forming a consistency group of tracks in a source volume to copy to a target volume, a copy of the volume table for the source volume is copied to a volume table copy providing a state of the tracks in the source volume as of a consistency group time. A determination is made of space for tracks in the source volume to release comprising tracks that are indicated in the volume table copy as available to release excluding tracks in the source volume that are written after the consistency group time.

Further, described embodiments provide optimizations to release space by processing a volume table copy, representing the state of the source volume as of a consistency group time of a consistency group being formed, to determine space for tracks in the source volume to release while tracks in the source volume are copied to the target volume to form the consistency group. In this way, the releasing of the space does not interfere with the forming of the consistency group because the space releasing may be performed while copying the tracks to the target volume to form the consistency group.

In a yet further optimization to space release computer technology in a mirror copying environment, tracks are not released that are written in the next consistency group by excluding tracks from space release that are written after the consistency group time. In this way, space is not released for written tracks in the next consistency group because that space will be needed for the written tracks in the next consistency group. This reduces unnecessary operations to release space and have to reallocate that space for a written track in the next consistency group to form.

Figure 1:
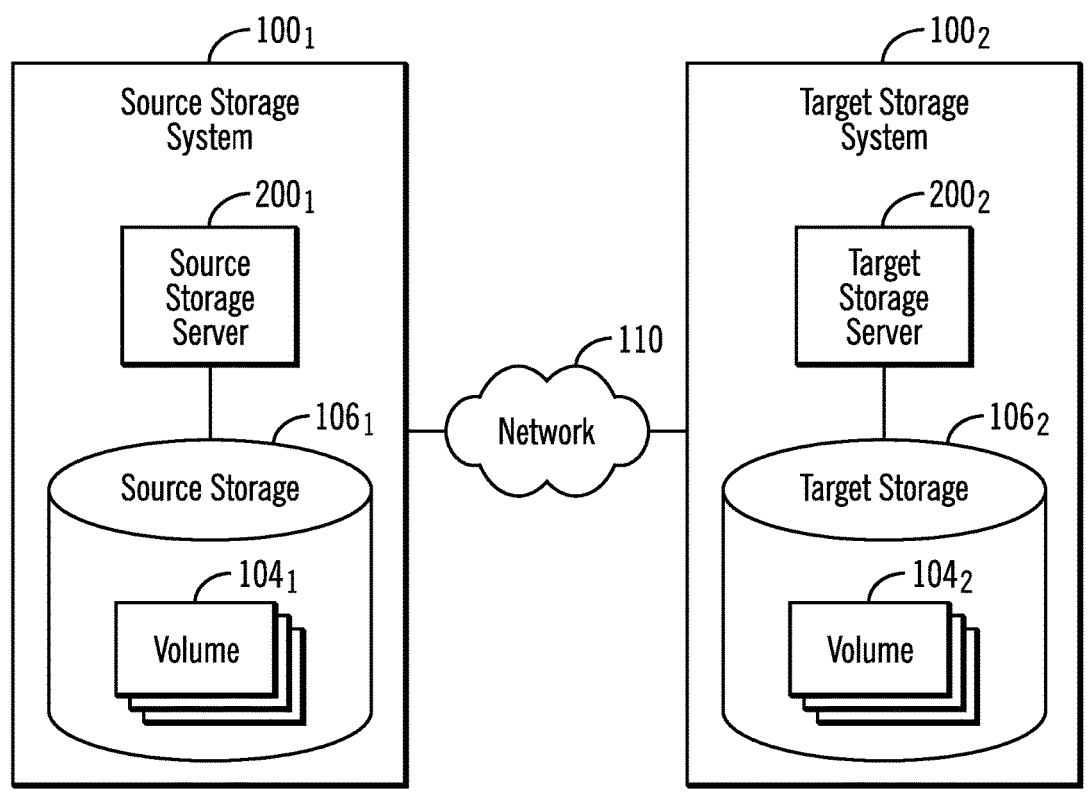
FIG. 1 illustrates an embodiment of a storage environment.

FIG. 1 illustrates an embodiment of a data storage environment having at least two storage systems $100_1$ and $100_2$, each including storage servers $200_1$ and $200_2$, respectively, managing access to volumes $104_1$ and $104_2$ configured in storages $106_1$ and $106_2$. Host systems (not shown) may perform read and write operations with respect to the first storage system $100_1$ over a storage network 110. The first storage $106_1$ may comprise a primary production volume to which hosts direct read and write request. The source storage server $200_1$ may mirror tracks in the volumes $104_1$ to the target storage system $100_2$ to maintain data in consistency groups at the second storage server $200_2$. A track may comprise any data unit type, such as a track, logical block, extent, page, etc.

The term "storage system" as used herein may refer to a storage server $200_1$, $200_2$ and/or the storage $106_1$, $106_2$ managed by the server.

The storages $106_1$, $106_2$ may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes $104_1$, $104_2$ may further be configured from an array of devices, such as Just a Bunch of Disks (JBOD), Direct Access Storage Device (DASD), Redundant Array of Independent Disks (RAID) array, virtualization device, etc. Further, the storages $106_1$, $106_2$ may comprise heterogeneous storage devices from different vendors and different types of storage devices, such as a first type of storage devices, e.g., hard disk drives, that have a slower data transfer rate than a second type of storage devices, e.g., SSDs.

The storage network 110 used by the storage systems $100_1$ and $100_2$ to mirror data may comprise a storage network such as one or more interconnected Local Area Networks (LAN), Storage Area Networks (SAN), Wide Area Network (WAN), peer-to-peer network, wireless network, etc.

A volume $104_1$, $104_2$ may comprise any logical or physical allocation of data, such as a logical volume, logical unit number (LUN), logical device, logical disk, etc. The volumes $104_1$, $104_2$ may comprise thin provisioned volumes, meaning that tracks are only allocated in the storage $106_1$, $106_2$ for a volume when needed to store data. The space release operations described herein release space in the volumes $104_1$, $104_2$ to be available for allocation to other thin provisioned volumes.

Figure 2:
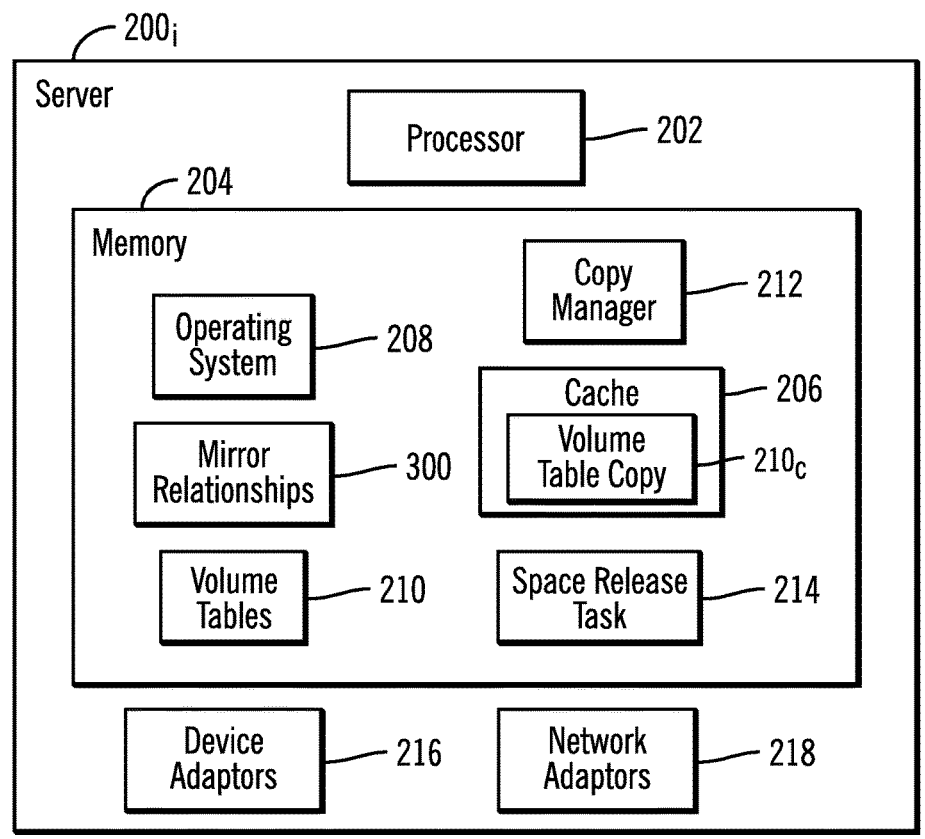
FIG. 2 illustrates an embodiment of components in a server in the storage environment of FIG. 1.

FIG. 2 shows components of a server $200_i$, such as the first server $200_1$ and second server $200_2$, as including a processor 202 and a memory 204 including programs executed by the processor 202 as well as a cache 206 to cache read and write data for the first storage $106_1$. The cache 206 may also store data being transferred between the servers $200_1$, $200_2$ as part of mirror copy relationships. The memory 204 includes an operating system 208, which forms volumes $104_1$ and maintains volume tables 210, such as a volume table of contents (VTOC), file allocation table, etc., providing information on the tracks or extents of tracks allocated to the volume $104_i$ and free space in the volume, as well as other metadata. The cache 206 may store a volume table copy $210_C$ comprising a copy of a volume table 210 as of a consistency group time to maintain a state of a volume $104_1$ for a consistency group.

The operating system 208 may manage volumes $104_i$ as thin provisioned volumes and allocate space to the provisioned but unallocated space and a space release task 214 may issue commands to the device adaptors 216 to release space allocated to a thin provisioned volume $104_i$ to make available to assign to other volumes $104_j$.

The memory 204 includes a copy manager 212 to create and manage mirror relationships 300 to mirror data in volumes $104_1$ in the first storage system $100_1$ to a target volume $104_2$ the target storage system $100_2$ as part of consistency groups. The operating system 208 may further spawn one or more space release tasks 214 to process the volume table copy $210_C$ to determine space to release for tracks in a volume $104_1$.

The server $200_i$ includes one or more device adaptors 216 to communicate with devices in the source storage $106_i$ and one or more network adaptors 218 to communicate with the network 110 and manage the transfer of data on the network 110.

Figure 3:
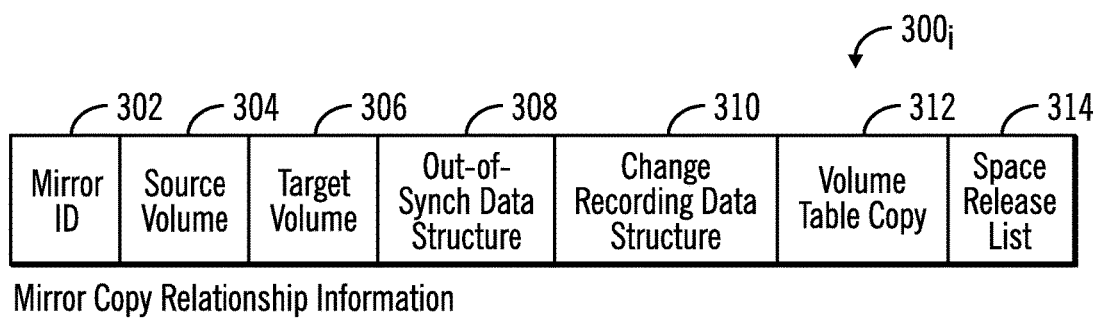
FIG. 3 illustrates an embodiment of copy relationship information.

FIG. 3 illustrates an embodiment of an instance of a mirror copy relationship $300_i$, which may include a mirror copy identifier 302 identifying the mirror copy created by the copy manager 212; a source volume 304, such as all or part of a source volume $104_1$, from which data is copied; a target volume 306, such as all or part of a target volume $104_2$, to which data is copied from the source volume 304; an out-of-synch data structure 308, such as a bitmap, indicating tracks or other data units in the source volume 304 that have been written, i.e., updated or changed, and need to be copied to the target volume 306; change recording data structure 310, such as a change recording bitmap, indicating source 304 tracks that have been updated or changed to be included in the next consistency group to form; a volume table copy 312 comprising a copy of a volume table 210, which may be stored in the cache 206, having a state of the tracks in the source volume 304 as of a consistency group time; and a space release list 314 indicating tracks in the source volume 304 to release.

To create a new consistency group, the change recording data structure 310, indicating data written, i.e., updated, while copying written data for the current consistency group being formed, is merged with the out-of-synch data structure 308, which does not indicate tracks to copy after the current consistency group is completed. After the merging, the change recording data structure 310 is cleared to record new updates for a next consistency group while the data indicated as changed in the out-of-synch data structure 308 is being copied to the target volume 306 to form the current consistency group.

Figure 4:
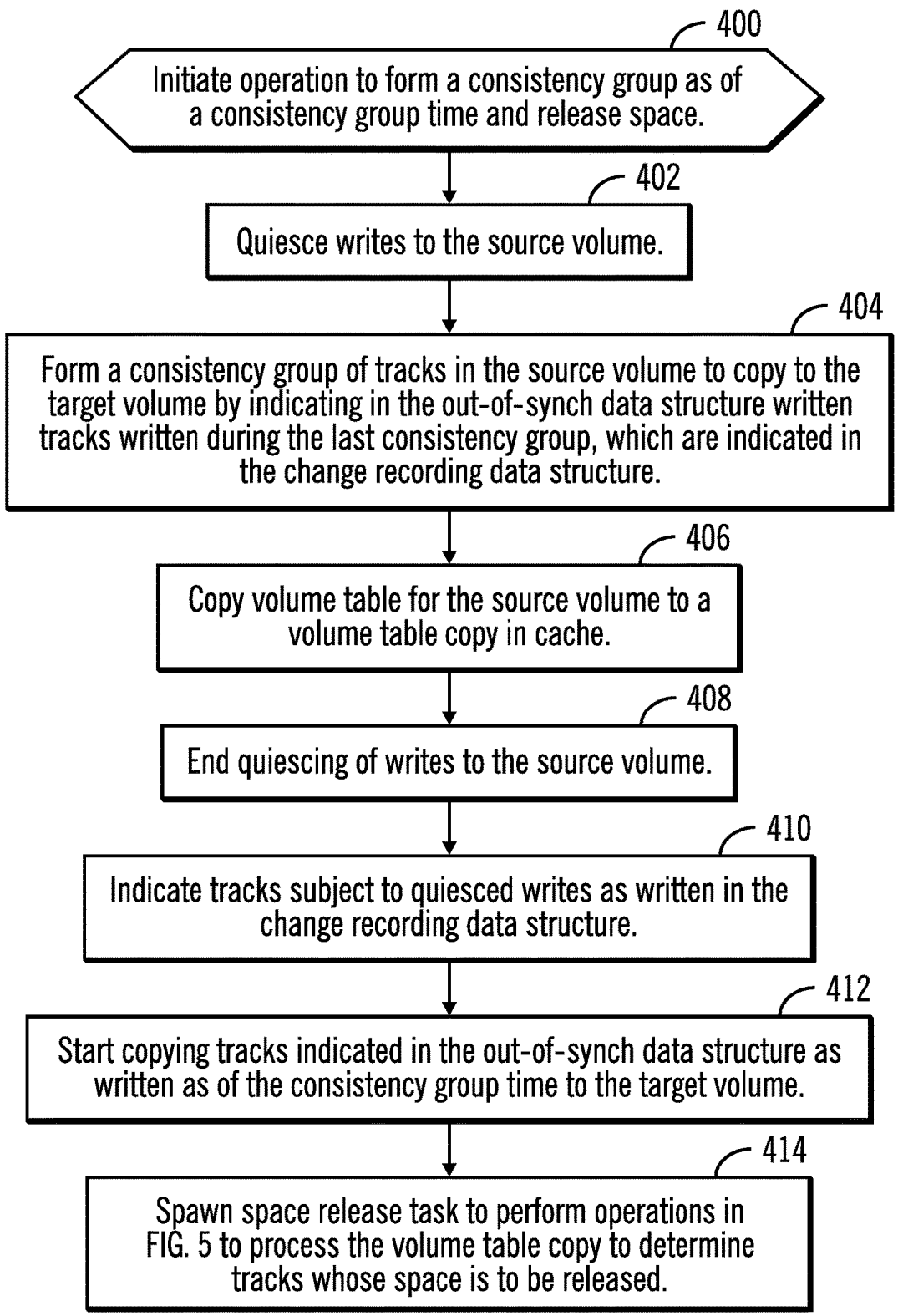
FIG. 4 illustrates an embodiment of operations to form a consistency group.

FIG. 4 illustrates an embodiment of operations performed by the copy manager 212 to form a consistency group as of a consistency group time and release space during the operations to form the consistency group. Upon initiating an operation to form a consistency group, the copy manager 212 quiesces (at block 402) writes to the source volume 304, where the quiesced writes may be stored in the cache 206. The copy manager 212 forms (at block 404) a consistency group of tracks in the source volume 304 to copy to the target volume 306 by indicating in the out-of-synch data structure 308 tracks in the source volume 304 written during formation of the last consistency group, which are indicated in the change recording data structure 310. The indicating the written tracks in the out-of-synch data structure 308 may be performed by merging the change recording data structure 310 with the out-of-synch data structure 308, or by toggling the data structures 308, 310, i.e., renaming the change recording data structure 310 to be the out-of-synch data structure 308 and renaming the cleared out-of-synch data structure 308 to the change recording data structure 310. The volume table 210 for the source volume 304 is copied (at block 406) to the volume table copy $210_C$ indicated in the volume table copy 312. The quiescing of writes is ended (at block 408) and the quiesced write tracks are indicated as written (at block 410) in the change recording data structure 310, for the next consistency group to form.

At this point, the copy manager 212 may start copying (at block 412) tracks indicated in the out-of-synch data structure 308 as written as of the consistency group time to the target volume. When a track indicated in the out-of-synch data structure 308 is copied to the target volume 306, the indication of the track in the out-of-synch data structure is reset to indicate the track does not need to be copied, i.e., is not written, such as by setting the bit representing the track to zero. The copy manager 212 spawns (at block 414) one or more space release tasks 214 to perform the operations in FIG. 5 process the volume table copy 312 to determine tracks whose space is to be released.

With the embodiment of FIG. 4, the formation of a consistency group is initiated by generating the out-of-synch data structure 308 to indicate the tracks to copy and to make a copy $210_C$ of the volume table 210 as of the consistency group time to use to determine space to release while the tracks in the consistency group, indicated in the out-of-synch data structure 308, are being copied from the source volume 304 to the target volume 306.

FIG. 4 describes operations performed by the copy manager 212 to form a consistency group and release space allocated to a source volume in a source-target volume pair in a mirror copy relationship $300_i$. However, the operations of FIG. 4 may be performed for multiple source and target volume pairs identified in multiple mirror copy relationships $300_1$ . . . $300_n$ to maintain data in the target volumes $306_1$ . . . $306_n$ is consistent as of the same consistency group time. The source volumes $304_1$ . . . $304_n$ and the target volumes $306_1$ . . . $306_n$ in a consistency group may be stored in different source storage systems $100_1$ and different target storage systems $100_2$, respectively, or the multiple source and target volume pairs may be stored in the same source storage system $100_1$ and target storage system $100_2$.

Figure 5:
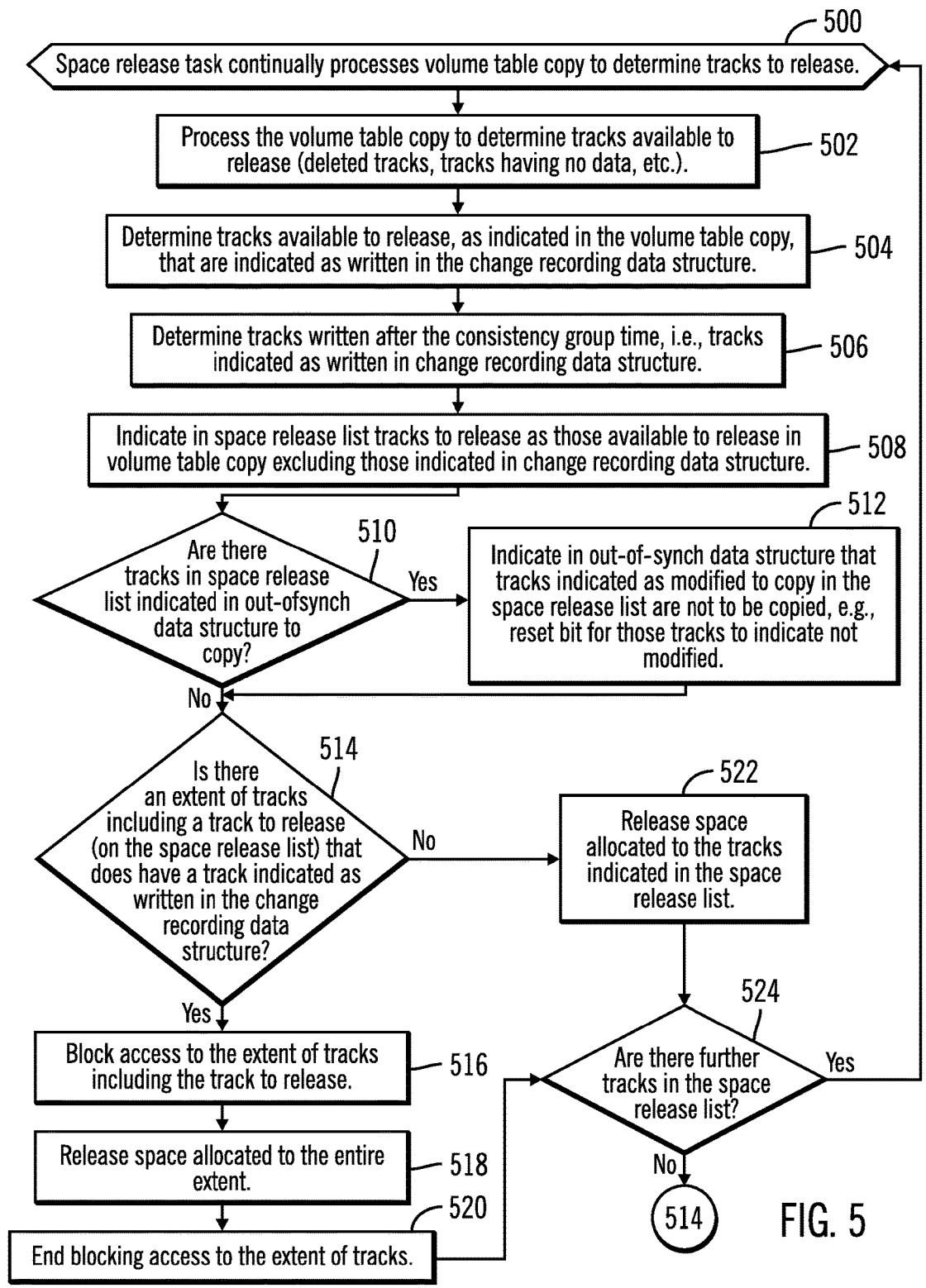
FIG. 5 illustrates an embodiment of operations to determine space to release for tracks in a consistency group.

FIG. 5 illustrates an embodiment of operations performed by a space release task 214 to determine space to release for tracks in the source volume 304 being mirrored to a target volume 306. Upon initiating (at block 500) space release operations, the space release task 214 processes (at block 502) the volume table copy 312 to determine tracks in the source volume 304 of the mirror copy relationship $300_i$ available to release, e.g., deleted tracks, tracks having no data, etc. The space release task 214 determines (at block 504) tracks available to release, as indicated in the volume table copy 312, that are also not indicated as written in the change recording data structure 310. The space release task 214 indicates (at block 508) in a space release list 314 tracks to release as those available to release in volume table copy 312 excluding those indicated in change recording data structure 310 as written in the next consistency group. If (at block 510) there are tracks in the space release list 314 indicated in the out-of-synch data structure 308 to copy, then indication is made (at block 512) in the out-of-synch data structure 308 that tracks indicated as written to copy in the space release list 314 are not to be copied, e.g., reset bit for those tracks to indicate not modified in the out-of-synch data structure 308.

If (at block 510) there are no tracks in the space release list 314 indicated in the out-of-synch data structure 308 or after resetting bits in the out-of-synch data structure for tracks indicated in the space release list (at block 512), the space release task 214 determines (at block 514) whether an extent of tracks including a track to release (on the space release list 314) does not have a track indicated as written in the change recording data structure 310. If (at block 514) there is an extent including a track on the space release list 314 not having a written track for the next consistency group, i.e., indicated as written in the change recording data structure 310, then the space release task 214 blocks (at block 516) access to the extent of tracks including the track to release and releases (at block 518) the space allocated to the entire extent, such as by sending a command to the device adaptor 216 to release space allocated to the entire extent. Once space for a track indicted in the space release list 314 is removed, indication of that track is removed from the space release list 314. The block of access to the extent subject to space release is then ended (at block 520).

If (at block 514) there is no extent including a track on the space release list 314 that does not include write tracks indicated in the change recording data structure 310, then the space release task 214 releases (at block 522) space allocated to the tracks indicated in the space release list 314, such as by sending a space release command to the device adaptor 216 to release space allocated to the tracks indicted in the space release list 314. If (at block 524) there are further tracks in the space release list 314, then control proceeds back to block 514 to process. Otherwise, if the space release list 314 is empty, control proceeds back to block 500 to continually process the volume table copy 312 to determine space for tracks to release.

With the operations of FIG. 5, the space release task 214 processes the volume table copy 312 to determine tracks available to release in the source volume 304 that were not written in the next consistency group, i.e., not indicated as written in the change recording data structure 310. The space for these tracks are then available to release because the space for these tracks does not need to be provisioned at least for the next consistency group. Further, at this time, space for an entire extent including the track to release may also be released because if there are no writes in the next consistency group for the extent, i., no writes indicated in the change recording data structure 310 for the extent. In this way, space is released to be made available for other provisioned volumes for tracks that have no immediate need for the space.

If there are multiple source and target volumes in a consistency group, then multiple space release tasks 214 may be spawned to process the volume table copies 312 for the different source and target volume pairs to select space for tracks in all the source volumes in the consistency group to release using the operations of FIG. 5. In this way, the improvements to space release technology of FIG. 5 may be realized for all source volumes in a consistency group.

Figure 6:
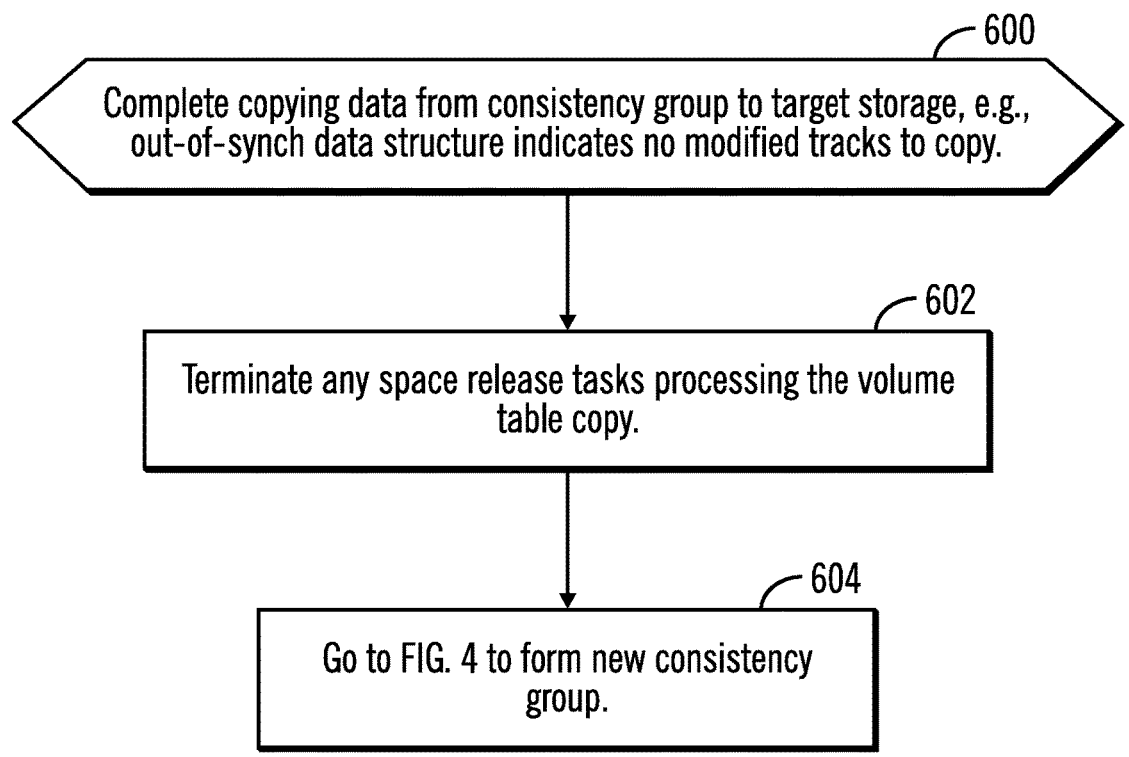
FIG. 6 illustrates an embodiment of operations to complete a consistency group.

FIG. 6 illustrates an embodiment of operations performed by the copy manager 212 when completing the copying of data for a consistency group indicated in an out-of-synch data structure 308, such as when there are no tracks in the out-of-synch data structure 308 that are indicated as written and need to be copied. Upon completing (at block 600) copying data for a consistency group, such as when the out-of-synch data structure 308 indicates no written tracks to copy, the copy manager 212 terminates (at block 602) any space release tasks 214 processing the volume table copy 312. The copy manager 212 then performs (at block 604) the operations in FIG. 4 to form a new consistency group.

In embodiments where there are multiple source and target volumes in a consistency group, then the operations of FIG. 6 would be performed when the out-of-synch data structures 308 for all the source and target volume pairs are cleared.

Described embodiments provide optimizations to the computer technology for determining when to release space allocated to tracks in a mirror copy relationships by determining space to release during the mirroring of the tracks in the source volume, and releasing space indicated in a volume table copy and that was not written in the next consistency group, i.e., after the consistency group time.

In the described embodiments, the copy operation comprises a mirror copy operation, such as an asynchronous or synchronous mirror. In alternative embodiments, the copy operation may comprise another type of copy operation such as a point-in-time copy operation, such as a snapshot copy.

The reference characters used herein, such as i and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
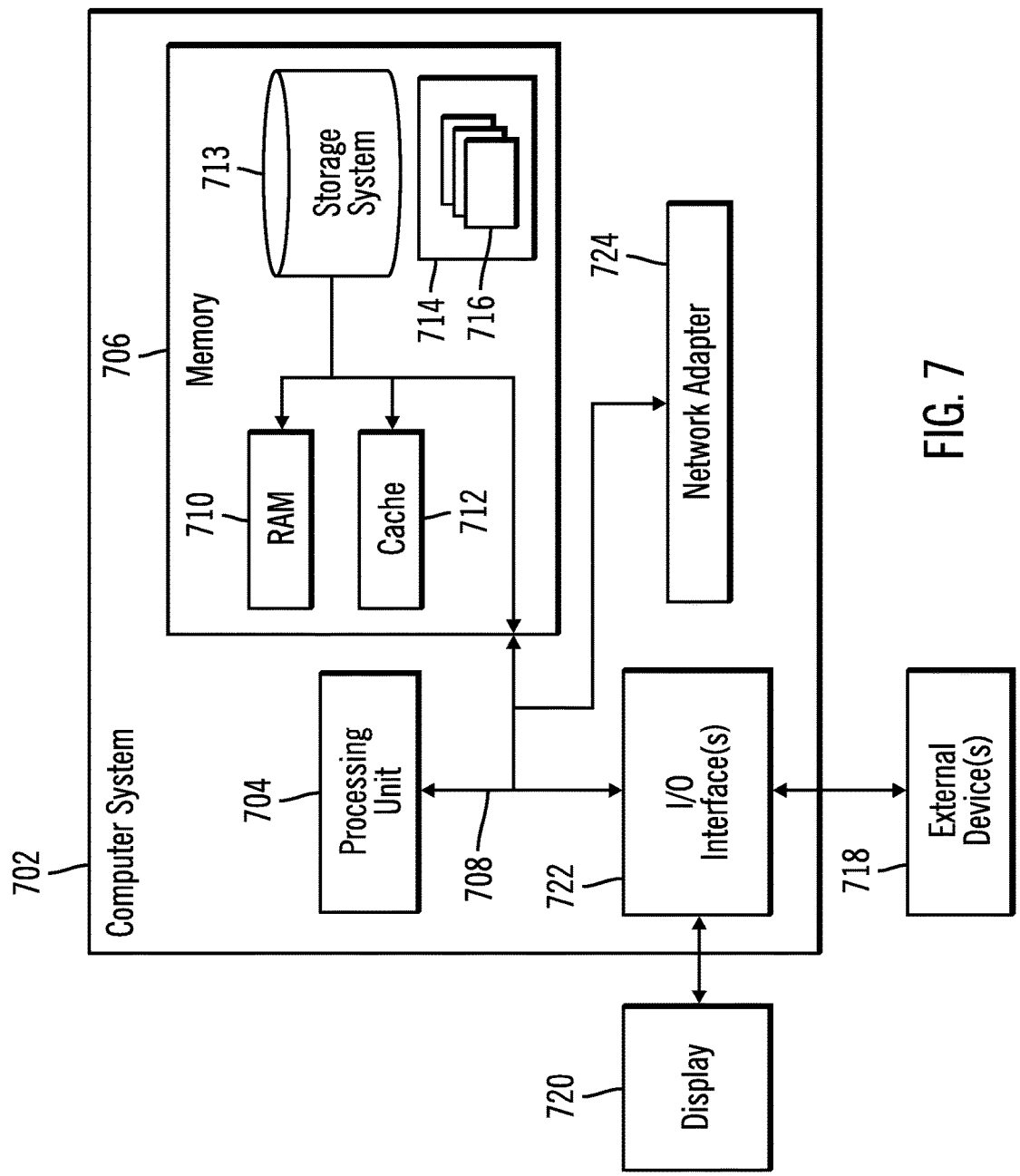
FIG. 7 illustrates a computing environment in which the components of FIG. 1 may be implemented.

The computational components of FIG. 1, including the servers 200₁, 200₂ may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for releasing space in a source volume to copy to a target volume, wherein the computer program product comprises a computer readable storage medium having program instructions executable by a processor to cause operations, the operations comprising:
   forming a consistency group of tracks in the source volume to copy to the target volume;
   copying a volume table providing information on the tracks allocated to the source volume to a volume table copy in a memory providing a state of the tracks in the source volume as of a consistency group time;
   determining tracks in the source volume to release for tracks that are indicated in the volume table copy as available to release excluding tracks in the source volume that are written after the consistency group time; and
   releasing space allocated to the determined tracks.

2. The computer program product of claim 1, wherein the operations further comprise:
   copying written tracks in the consistency group to the target volume, wherein the determining, from the volume table copy, tracks that are available to release as of the consistency group time is performed while copying the written tracks in the consistency group to the target volume.

3. The computer program product of claim 1, wherein the forming the consistency group comprises:
   quiescing writes to the source volume;
   forming an out-of-synch data structure indicating tracks in the source volume written while tracks from a previous consistency group were being copied to the target volume, as indicated in a change recording data structure, wherein the copying the volume table to the volume table copy is performed while the writes are quiesced;
   stopping the quiescing writes to allow the writes to proceed to the source volume;
   indicating in the change recording data structure tracks written by the quiesced writes and writes received while copying the tracks indicated in the out-of-synch data structure to the target volume; and
   copying tracks indicated in the out-of-synch data structure as written to the target volume in response to stopping the quiescing of the writes.

4. The computer program product of claim 3, wherein the forming the consistency group further comprises:
   stopping the determining the tracks to release in response to completing copying all tracks indicated as written in the out-of-synch data structure.

5. The computer program product of claim 1, wherein the operations further comprise:
   maintaining an out-of-synch data structure indicating updated tracks in the consistency group to copy to the source volume; and
   maintaining a change recording data structure indicating writes to tracks in the source volume that occur while copying the tracks indicated in the out-of-synch data structure, wherein the tracks indicated in the change recording data structure as written comprise the tracks to exclude from those tracks the volume table copy indicates as available to release.

6. The computer program product of claim 5, wherein the operations further comprise:
   selecting a track of the determined tracks to release that is indicated in the out-of-synch data structure to copy to the target volume; and
   indicating in the out-of-synch data structure that the selected track is not to be copied to the target volume.

7. The computer program product of claim 1, wherein there are a plurality of source volumes and target volumes to which the tracks in the source volumes are copied, wherein the operations of forming the consistency group, copying the volume table, determining tracks to release, and releasing the space are performed for each of the plurality of source volumes to maintain data in the target volumes consistent as of the consistency group time.

8. The computer program product of claim 7, wherein the operations further comprise:
   initiating multiple threads to process volume table copies for the source volumes to determine the tracks to release in the source volumes.

9. The computer program product of claim 1, wherein the releasing space allocated to the determined tracks to release comprises:
   determining whether an extent including a track of the determined tracks to release includes tracks in the source volume written after the consistency group time; and
   releasing space allocated to the extent in response to determining that the extent does not include tracks written after the consistency group time.

10. The computer program product of claim 9, wherein the releasing space allocated to the determined tracks further comprises:
    blocking access to the extent in response to determining that the extent does not include tracks written after the consistency group time; and
    ending blocking of the access to the extent in response to releasing the space allocated to the extent.

11. The computer program product of claim 1, wherein the source volume comprises a thin provisioned volume, and wherein the space is released from the source volume to make available to other volumes configured in a source storage in which the source volume is configured.

12. A system for releasing space in a source volume to copy to a target volume, comprising:
    a processor; and
    a computer readable storage medium having program instructions executable by a processor to cause operations, the operations
    forming a consistency group of tracks in the source volume to copy to the target volume;
    copying a volume table providing information on the tracks allocated to the source volume to a volume table copy in a memory providing a state of the tracks in the source volume as of a consistency group time;
    determining tracks in the source volume to release for tracks that are indicated in the volume table copy as available to release excluding tracks in the source volume that are written after the consistency group time; and
    releasing space allocated to the determined tracks.

13. The system of claim 12, wherein the operations further comprise:
copying written tracks in the consistency group to the target volume, wherein the determining, from the volume table copy, tracks that are available to release as of the consistency group time is performed while copying the written tracks in the consistency group to the target volume.

14. The system of claim 12, wherein the operations further comprise:
maintaining an out-of-synch data structure indicating updated tracks in the consistency group to copy to the source volume; and
maintaining a change recording data structure indicating writes to tracks in the source volume that occur while copying the tracks indicated in the out-of-synch data structure, wherein the tracks indicated in the change recording data structure as written comprise the tracks to exclude from those tracks the volume table copy indicates as available to release.

15. The system of claim 14, wherein the operations further comprise:
selecting a track of the determined tracks to release that is indicated in the out-of-synch data structure to copy to the target volume; and
indicating in the out-of-synch data structure that the selected track is not to be copied to the target volume.

16. The system of claim 12, wherein there are a plurality of source volumes and target volumes to which the tracks in the source volumes are copied, wherein the operations of forming the consistency group, copying the volume table, determining tracks to release, and releasing the space are performed for each of the plurality of source volumes to maintain data in the target volumes consistent as of the consistency group time.

17. The system of claim 12, wherein the releasing space allocated to the determined tracks to release comprises:
determining whether an extent including a track of the determined tracks to release includes tracks in the source volume written after the consistency group time; and
releasing space allocated to the extent in response to determining that the extent does not include tracks written after the consistency group time.

18. A method for releasing space in a source volume to copy to a target volume, comprising:
forming a consistency group of tracks in the source volume to copy to the target volume;
copying a volume table providing information on the tracks allocated to the source volume to a volume table copy in a memory providing a state of the tracks in the source volume as of a consistency group time;
determining tracks in the source volume to release for tracks that are indicated in the volume table copy as available to release excluding tracks in the source volume that are written after the consistency group time; and
releasing space allocated to the determined tracks.

19. The method of claim 18, further comprising:
copying written tracks in the consistency group to the target volume, wherein the determining, from the volume table copy, tracks that are available to release as of the consistency group time is performed while copying the written tracks in the consistency group to the target volume.

20. The method of claim 18, further comprising:
maintaining an out-of-synch data structure indicating updated tracks in the consistency group to copy to the source volume; and
maintaining a change recording data structure indicating writes to tracks in the source volume that occur while copying the tracks indicated in the out-of-synch data structure, wherein the tracks indicated in the change recording data structure as written comprise the tracks to exclude from those tracks the volume table copy indicates as available to release.

21. The method of claim 20, further comprising:
selecting a track of the determined tracks to release that is indicated in the out-of-synch data structure to copy to the target volume; and
indicating in the out-of-synch data structure that the selected track is not to be copied to the target volume.

22. The method of claim 18, wherein there are a plurality of source volumes and target volumes to which the tracks in the source volumes are copied, wherein the operations of forming the consistency group, copying the volume table, determining tracks to release, and releasing the space are performed for each of the plurality of source volumes to maintain data in the target volumes consistent as of the consistency group time.

23. The method of claim 18, wherein the releasing space allocated to the determined tracks to release comprises:
determining whether an extent including a track of the determined tracks to release includes tracks in the source volume written after the consistency group time; and releasing space allocated to the extent in response to determining that the extent does not include tracks written after the consistency group time.

* * * * *